United States Patent
Stack (10) Patent No.: US 7,774,150 B2
(45) Date of Patent: Aug. 10, 2010

(54) METER ELECTRONICS AND METHODS FOR DETERMINING ONE OR MORE OF A STIFFNESS COEFFICIENT OR A MASS COEFFICIENT

(75) Inventor: Charles Paul Stack, Louisville, CO (US)

(73) Assignee: Micro Motion, Inc., Boulder, CO (US)

( * ) Notice: Subject to any disclaimer, the term of this patent is extended or adjusted under 35 U.S.C. 154(b) by 26 days.

(21) Appl. No.: 12/067,402

(22) PCT Filed: Oct. 3, 2005

(86) PCT No.: PCT/US2005/036201

§ 371 (c)(1),
(2), (4) Date: Mar. 19, 2008

(87) PCT Pub. No.: WO2007/040542

PCT Pub. Date: Apr. 12, 2007

(65) Prior Publication Data

US 2008/0234949 A1 Sep. 25, 2008

(51) Int. Cl.
*G01F 17/00* (2006.01)
*G01F 1/20* (2006.01)
(52) U.S. Cl. .................... 702/54; 73/861.18
(58) Field of Classification Search .................. 702/54,
702/45, 50, 56, 84–85, 100, 127, 137, 33–35,
702/39, 81, 105–106, 182–183, 185, 48;
73/1.16, 1.82, 1.83, 32 A, 32 R, 53.01, 54.01,
73/54.41, 61.41, 61.43, 61.44, 61.45, 64.53,
73/196, 570, 861, 861.18, 1.57, 1.73, 54.42,
73/61.49, 61.79, 202.5, 204.11, 204.18, 521,
73/579, 861.354, 861.355, 861.356, 863.02,
73/50.01
See application file for complete search history.

(56) References Cited

U.S. PATENT DOCUMENTS 4,920,787 A 5/1990 Dual et al.

(Continued)

FOREIGN PATENT DOCUMENTS

KR 200287836 11/2002

(Continued)

OTHER PUBLICATIONS

Kolahi et al., High Precision Density Measurement with Coriolis Mass Flowmeters, May 17-19, 2005, Instrumentation and Measurement Technology Conference, Ottawa, Canada, pp. 2270-2275.*
Kalotay P: "Density and viscosity monitoring systems using Coriolis flow meters" ISA Transactions, Instrument Society of America. Pittsburgh, US, vol. 38, No. 4, Nov. 25, 1999, pp. 303-310, XP004244796 ISSN: 0019-0578, Section 2.3 "Process density transducers based on the vibratory principle".

*Primary Examiner*—Michael P Nghiem
*Assistant Examiner*—Toan M Le
(74) *Attorney, Agent, or Firm*—The Ollila Law Group LLC (57) ABSTRACT

A meter electronics (20) for a flow meter (5) is provided according to an embodiment of the invention. The meter electronics (20) includes an interface (201) for receiving a vibrational response and a processing system (203). The processing system (203) receives the vibrational response, vibrates at least one flowtube (130) of the vibratory flow meter (5) and generates a first tube period $\tau_{m1}$ for a first flow material m1, vibrates the at least one flowtube (130) and generates a second tube period $\tau_{m2}$ for a second flow material m2, and determines one or more of a stiffness coefficient $C_1$ or a mass coefficient $C_2$ from the first tube period $\tau_{m1}$, a first density $\rho_{m1}$, the second tube period $\tau_{m2}$, and a second density $\rho_2$.

26 Claims, 6 Drawing Sheets

U.S. PATENT DOCUMENTS

| | | |
|---|---|---|
| 6,092,409 A | 7/2000 | Patten et al. |
| 6,327,915 B1 * | 12/2001 | Van Cleve et al. ..... 73/861.357 |
| 6,347,293 B1 | 2/2002 | Cunningham et al. |
| 6,360,579 B1 | 3/2002 | De Boom et al. |
| 6,782,333 B2 | 8/2004 | Baker et al. |
| 2007/0017274 A1 * | 1/2007 | Wheeler et al. .............. 73/1.16 |

FOREIGN PATENT DOCUMENTS

| | | |
|---|---|---|
| RU | 2247331 C2 | 2/2005 |
| WO | 0102816 A2 | 1/2001 |
| WO | WO-03021205 A1 | 3/2003 |
| WO | WO-2005/050145 A | 6/2005 |

* cited by examiner

METER ELECTRONICS AND METHODS FOR DETERMINING ONE OR MORE OF A STIFFNESS COEFFICIENT OR A MASS COEFFICIENT

BACKGROUND OF THE INVENTION

1. Field of the Invention

The present invention relates to a meter electronics and methods for a flow meter, and more particularly, to meter electronics and methods for determining one or more of a stiffness coefficient or a mass coefficient for a flow meter.

2. Statement of the Problem

Vibrating conduit sensors, such as Coriolis mass flow meters, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling. The instrumentation receives signals from the two pickoff sensors and processes the signals in order to derive a mass flow rate measurement.

The phase difference between the two sensor signals is proportional to the mass flow rate of the material flowing through the flow tube or flow tubes. The mass flow rate of the material is proportional to the time delay between the two sensor signals, and is therefore determined by multiplying the time delay by a flow Calibration Factor (FCF), where the time delay comprises a phase difference divided by frequency. The FCF reflects the material properties and cross-sectional properties of the flow tube. In the prior art, the FCF is determined by a calibration process prior to installation of the flow meter into a pipeline or other conduit. In the calibration process, a fluid is passed through the flow tube at a given flow rate and the proportion between the phase difference and the flow rate is calculated.

One advantage of a Coriolis flow meter is that the accuracy of the measured mass flow rate is not affected by wear of moving components in the flow meter. The flow rate is determined by multiplying the phase difference between two points of the flow tube and the flow calibration factor. The only input is the sinusoidal signals from the sensors, indicating the oscillation of two points on the flow tube. The phase difference is calculated from these sinusoidal signals. There are no moving components in the vibrating flow tube. Therefore, the measurement of the phase difference and the flow calibration factor are not affected by wear of moving components in the flow meter.

The FCF can be related to a stiffness characteristic of the meter assembly. If the stiffness characteristic of the meter assembly changes, then the FCF will also change. Changes therefore will affect the accuracy of the flow measurements generated by the flow meter. Changes in the material and cross-sectional properties of a flow tube can be caused by erosion or corrosion, for example. Consequently, it is highly desirable to be able to detect and/or quantify any changes to the stiffness of the meter assembly in order to maintain a high level of accuracy in the flow meter.

Another source of inaccuracy in a flow meter is a build-up or coating of the flow material within the flow conduit or conduits of the flow meter. The build-up can change the mass of the meter assembly, and consequently can affect mass flow rate measurements and can affect the measurement of other flow characteristics. It is highly desirable to be able to detect and/or quantify any flow material that is clinging to the inside of the flow conduit or conduits in order to maintain a high level of accuracy in the flow meter.

SUMMARY OF THE SOLUTION

Meter electronics for a flow meter is provided according to an embodiment of the invention. The meter electronics comprises an interface for receiving a vibrational response and a processing system in communication with the interface. The processing system is configured to receive the vibrational response from the interface, vibrate at least one flowtube of the vibratory flow meter and generate a first tube period $\tau_{m1}$ for a first flow material m1, vibrate the at least one flowtube of the vibratory flow meter and generate a second tube period $\tau_{m2}$ for a second flow material m2, and determine one or more of a stiffness coefficient $C_1$ or a mass coefficient $C_2$ from the first tube period $\tau_{m1}$, a first density $\rho_{m1}$, the second tube period $\tau_{m2}$, and a second density $\rho_{m2}$.

A method for determining a stiffness coefficient $C_1$ of a vibratory flow meter is provided according to an embodiment of the invention. The method comprises vibrating at least one flowtube of the vibratory flow meter and generating a first tube period $\tau_{m1}$ for a first flow material m1, vibrating the at least one flowtube of the vibratory flow meter and generating a second tube period $\tau_{m2}$ for a second flow material m2, and determining the stiffness coefficient $C_1$ from the first tube period $\tau_{m1}$, a first density $\rho_{m1}$, the second tube period $\tau_{m2}$, and a second density $\rho_{m2}$.

A method for determining a mass coefficient $C_2$ of a vibratory flow meter is provided according to an embodiment of the invention. The method comprises vibrating at least one flowtube of the vibratory flow meter and generating a first tube period $\tau_{m1}$ for a first flow material m1, vibrating the at least one flowtube of the vibratory flow meter and generating a second tube period $\tau_{m2}$ for a second flow material m2, and determining the mass coefficient $C_2$ from at least the second tube period $\tau_{m2}$, and a second density $\rho_{m2}$.

A method for determining a stiffness coefficient change in a vibratory flow meter is provided according to an embodiment of the invention. The method comprises vibrating at least one flowtube of the vibratory flow meter at a first time instance t1 and generating a first tube period $\tau_{m1,t1}$ for a first flow material m1, vibrating the at least one flowtube at substantially the first time instance t1 and generating a second tube period $\tau_{m2,t1}$ for a second flow material m2, and determining a first stiffness coefficient $C_{1,t1}$ at the first time instance t1 from the first tube period $\tau_{m1,t1}$, a first density $\rho_{m1,t1}$, the second tube period $\tau_{m2,t1}$, and a second density $\rho_{m2,t1}$. The method further comprises vibrating the at least one flowtube at a second time instance t2 and generating a third tube period $\tau_{m3,t2}$ for a third flow material m3, vibrating the at least one flowtube at substantially the second time instance t2 and generating a fourth tube period $\tau_{m4,t2}$ for a fourth flow material m4, and determining a second stiffness coefficient $C_{1,t2}$ at the second time instance t2 from the third tube period $\tau_{m3,t2}$, a third density $\rho_{m3,t2}$, the fourth tube period $\tau_{m4,t2}$, and a fourth density $\rho_{m4,t2}$. The method further comprises comparing the first stiffness coefficient $C_{1,t1}$ and the second stiffness coefficient $C_{1,t2}$ in order to determine if a stiffness of the vibratory flow meter has changed between the first time instance t1 and the second time instance t2.

A method for determining a mass coefficient change in a vibratory flow meter is provided according to an embodiment of the invention. The method comprises vibrating at least one flowtube of the vibratory flow meter at a first time instance t1 and generating a first tube period $\tau_{m1,t1}$ for a first flow material m1, vibrating the at least one flowtube at substantially the first time instance t1 and generating a second tube period $\tau_{m2,t1}$ for a second flow material m2, and determining a first mass coefficient $C_{2,t1}$ at the first time instance t1 from the first tube period $\tau_{m1,t1}$, a first density $\rho_{m1,t1}$, the second tube period $\tau_{m2,t1}$, and a second density $\rho_{m2,t1}$. The method further comprises vibrating the at least one flowtube at a second time instance t2 and generating a third tube period $\tau_{m3,t2}$ for a third flow material m3, vibrating the at least one flowtube at substantially the second time instance t2 and generating a fourth tube period $\tau_{m4,t2}$ for a fourth flow material m4, and determining a second mass coefficient $C_{2,t2}$ at the second time instance t2 from the third tube period $\tau_{m3,t2}$, a third density $\rho_{m3,t2}$, the fourth tube period $\tau_{m4,t2}$, and a fourth density $\rho_{m4,t2}$. The method further comprises comparing the first mass coefficient $C_{2,t1}$ and the second mass coefficient $C_{2,t2}$ in order to determine if a mass of the vibratory flow meter has changed between the first time instance t1 and the second time instance t2.

ASPECTS OF THE INVENTION

In one aspect of the meter electronics, the first flow material m1 comprises a gas and the second flow material m2 comprises a liquid.

In another aspect of the meter electronics, the first flow material m1 comprises air and the second flow material m2 comprises water.

In yet another aspect of the meter electronics, the stiffness coefficient $C_1$ comprises $C_1 = (\rho_{m1} - \rho_{m2}) / ((\tau_{m1})^2 - (\tau_{m2})^2)$.

In yet another aspect of the meter electronics, the mass coefficient $C_2$ comprises $C_2 = C_1 (\tau_{m2})^2 - \rho_{m2}$.

In yet another aspect of the meter electronics, the mass coefficient $C_2$ comprises $C_2 = [(\rho_{m1} - \rho_{m2}) / ((\tau_{m1})^2 - (\tau_{m2})^2)] (\tau_{m2})^2 - \rho_{m2}$.

In yet another aspect of the meter electronics, the processing system is further configured to generate a second stiffness coefficient $C_{1,t2}$ at a second time, compare the second stiffness coefficient $C_{1,t2}$ to the stiffness coefficient $C_1$, and generate an error condition if the second stiffness coefficient $C_{1,t2}$ differs from the stiffness coefficient $C_1$ by more than a predetermined stiffness tolerance.

In yet another aspect of the meter electronics, the processing system is further configured to generate a second mass coefficient $C_{2,t2}$ at a second time, compare the second mass coefficient $C_{2,t2}$ to the mass coefficient $C_2$, and generate an error condition if the second mass coefficient $C_{2,t2}$ differs from the mass coefficient $C_2$ by more than a predetermined mass tolerance.

In one aspect of the method, the first flow material m1 comprises a gas and the second flow material m2 comprises a liquid.

In another aspect of the method, the first flow material m1 comprises air and the second flow material m2 comprises water.

In yet another aspect of the method, the stiffness coefficient $C_1$ comprises $C_1 = (\rho_{m1} - \rho_{m2}) / ((\tau_{m1})^2 - (\tau_{m2})^2)$.

In yet another aspect of the method, the method further comprises generating a second stiffness coefficient $C_{1,t2}$ at a second time, comparing the second stiffness coefficient $C_{1,t2}$ to the stiffness coefficient $C_1$, and generating an error condition if the second stiffness coefficient $C_{1,t2}$ differs from the stiffness coefficient $C_1$ by more than a predetermined stiffness tolerance.

In yet another aspect of the method, the mass coefficient $C_2$ comprises $C_2 = C_1 (\tau_{m2})^2 - \rho_{m2}$.

In yet another aspect of the method, the mass coefficient $C_2$ comprises $C_2 = [(\rho_{m1} - \rho_{m2}) / ((\tau_{m1})^2 - (\tau_{m2})^2)] (\tau_{m2})^2 - \rho_{m2}$.

In yet another aspect of the method, the method further comprises generating a second mass coefficient $C_{2,t2}$ at a second time, comparing the second mass coefficient $C_{2,t2}$ to the mass coefficient $C_2$, and generating an error condition if the second mass coefficient $C_{2,t2}$ differs from the mass coefficient $C_2$ by more than a predetermined mass tolerance.

DESCRIPTION OF THE DRAWINGS

The same reference number represents the same element on all drawings.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
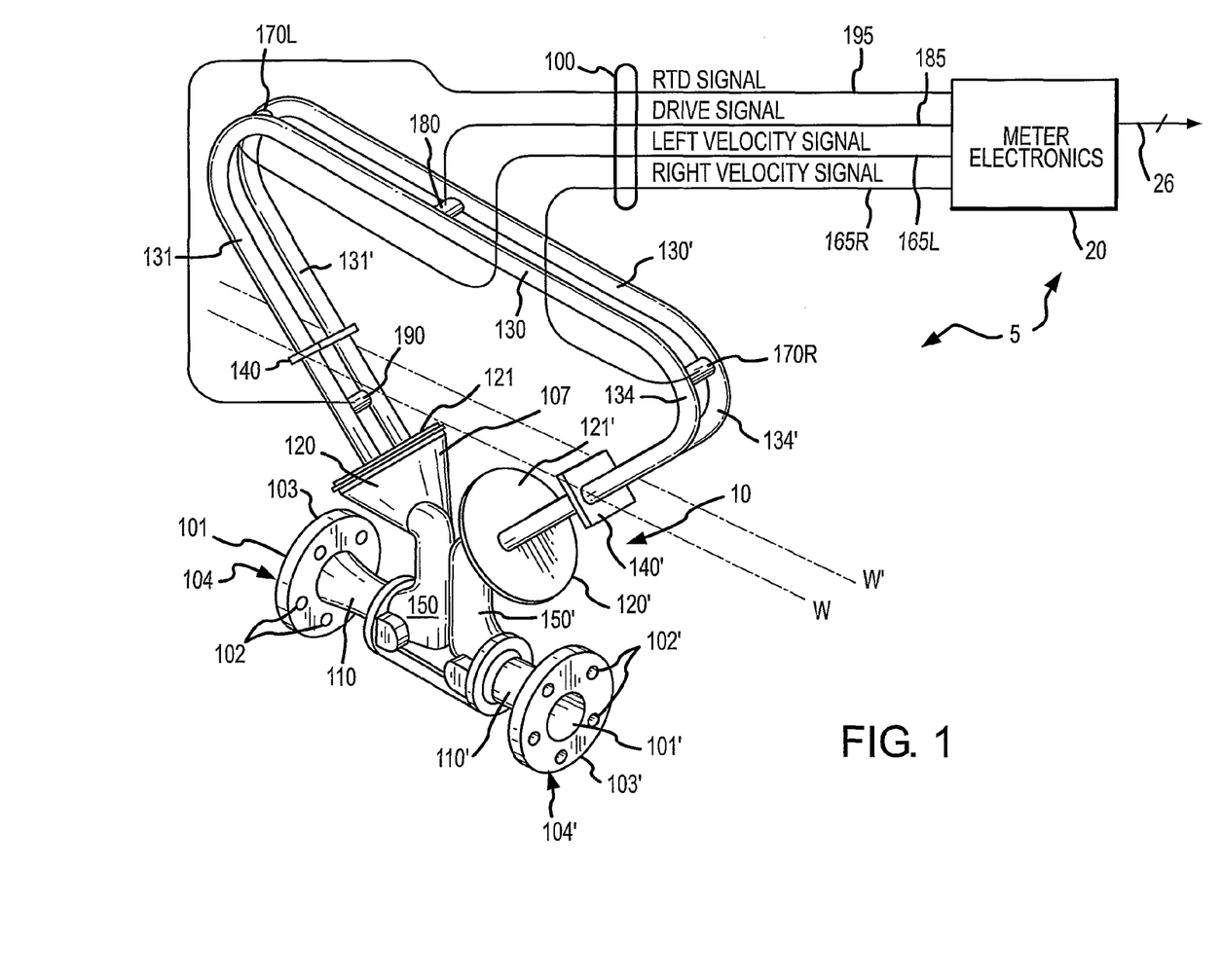
FIG. 1 shows a flow meter comprising a meter assembly and meter electronics.

FIG. 1 shows a flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W—W and W'—W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means 29.

Figure 2:
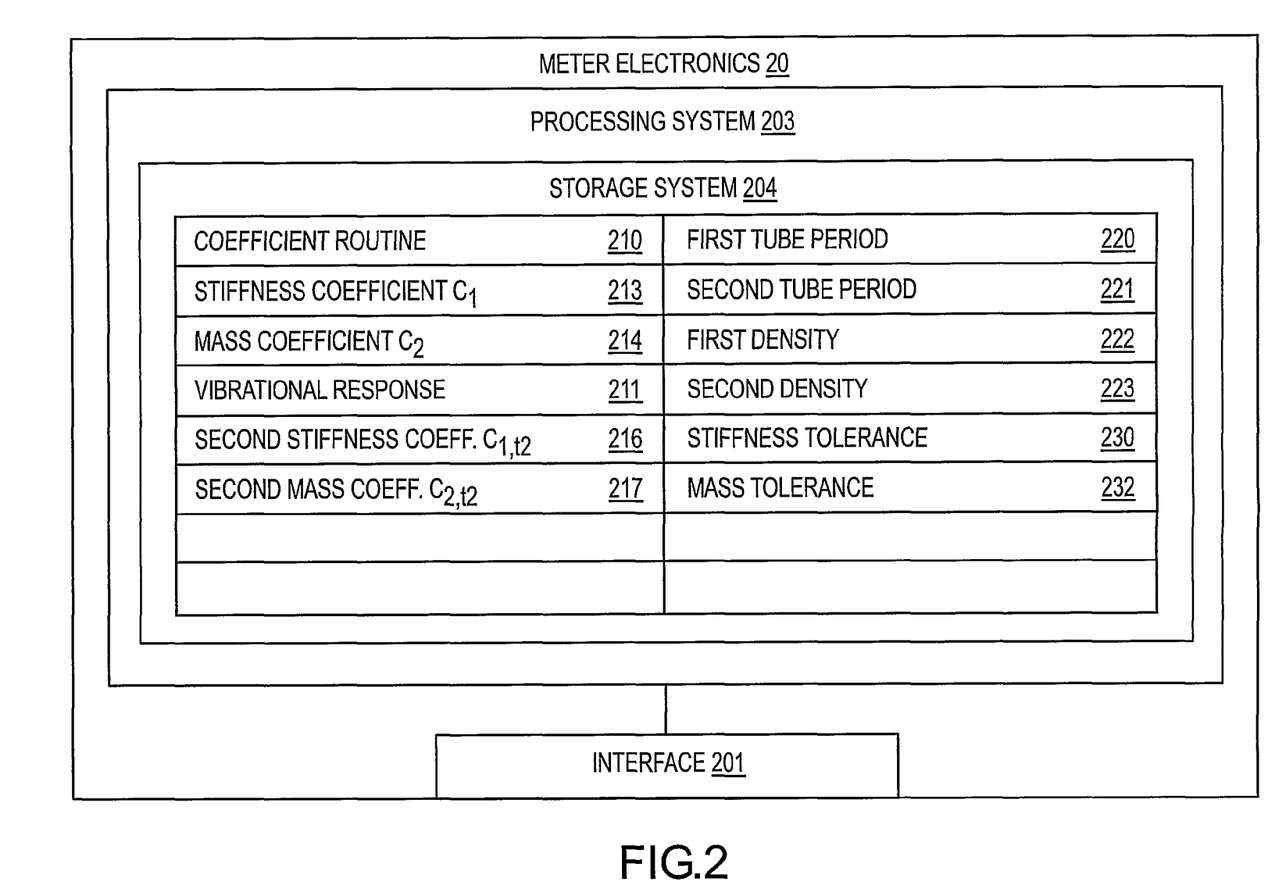
FIG. 2 shows the meter electronics according to an embodiment of the invention.

FIG. 2 shows the meter electronics 20 according to an embodiment of the invention. The meter electronics 20 can include an interface 201 and a processing system 203. The meter electronics 20 receives a vibrational response 211, such as from the meter assembly 10, for example. The meter electronics 20 processes the vibrational response 211 in order to obtain flow characteristics of the flow material flowing through the meter assembly 10. In addition, in the meter electronics 20 according to the invention, the vibrational response 211 is also processed in order to determine meter coefficients. Specifically, the vibrational response 211 can be processed in order to determine a stiffness coefficient $C_1$ and a mass coefficient $C_2$, among other things.

In operation, the meter electronics 20 receives a vibrational response 211 and processes two or more such vibrational responses 211 in order to determine a stiffness coefficient $C_1$ 213 and a mass coefficient $C_2$ 214 for the meter assembly 10. Any two distinct flow materials can be placed in the meter assembly 10 and the meter assembly 10 can be vibrated in order to produce a measured vibrational response. The two flow materials should be substantially distinct in terms of density. Two effective flow materials for this process are a gas and a liquid, such as air and water, for example. However, other flow materials can be used.

A novel aspect is that two flow fluids are used for the density calibration, wherein the invention can generate an estimate of the sensor stiffness and mass. The stiffness measurement can be used to determine changes in the Flow Calibration Factor (FCF). The mass term can be used to detect product build-up.

The invention is significant because it enables the meter electronics 20 to perform a flow calibration factor determination without performing an actual flow calibration test. In enables an FCF determination without a calibration test stand or other special equipment or special fluids. This is desirable because a means to perform a flow calibration is not always possible in the field, but access to two fluids for the density calibration is generally easy to achieve.

A simple model can be used in order to illustrate the invention. The natural (or resonant) frequency f for a single degree of freedom system can be expressed as:

$$f = \frac{1}{2\pi}\sqrt{\frac{K}{M_{tube} + M_{material}}} \qquad (1)$$

Here, K is the meter stiffness, $M_{tube}$ is the mass of the flowtube, and $M_{material}$ is the mass of the flow material in the flowtube. It can be seen from equation (1) that if the meter stiffness K changes, the measured frequency response f will change, in error. Therefore, changes in the meter stiffness K can result in a degraded accuracy of the flow meter 5. Any other flow characteristics derived from the frequency and/or density will also exhibit a degraded accuracy.

The mass of the flow material $M_{material}$ is equal to the density of the flow material $\rho_{material}$ multiplied by the volume V of the flow material. Substituting this into equation (1) produces:

$$f = \frac{1}{2\pi}\sqrt{\frac{K}{M_{tube} + \rho_{material}V}} \quad (2)$$

Equation (2) can be solved for fluid density, yielding:

$$\rho = \frac{K}{4\pi^2 V}\tau^2 - \frac{M_{tube}}{V} \quad (3)$$

Here $\tau$ is the tube period (i.e., the reciprocal of the tube frequency, $\tau = 1/f$). It can be seen in equation (3) that the density is related to the square of the tube period through two coefficients. This equation can also be written as:

$$\rho = C_1\tau^2 - C_2 \quad (4)$$

From equation (4), it can be seen that a change in the stiffness coefficient $C_1$ will cause an error in a measured density if the original values for the stiffness coefficient $C_1$ (and the mass coefficient $C_2$) are used to calculate a density value for a current vibrational response.

The first coefficient $C_1$ is directly related to a stiffness characteristic of the flow meter, comprising:

$$C_1 = \frac{K}{4\pi^2 V} \quad (5)$$

Therefore, the stiffness coefficient $C_1$ can be used to determine whether the Flow Calibration Factor (FCF) has changed over time, as the FCF is directly related to stiffness.

The second coefficient $C_2$ is directly related to the mass of the meter assembly 10. The second coefficient $C_2$ comprises:

$$C_2 = \frac{M_{tube}}{V} \quad (6)$$

The mass coefficient $C_2$ can be used to detect and determine changes to the mass of the meter assembly 10. For example, a change in the second coefficient $C_2$ over time can be used to determine whether a flowtube is being coated by the flow material, as a coating of flow material will change the mass of the meter assembly 10. A coating (or any other retained mass) will restrict the flow in the flow meter 5 and can reduce the accuracy of any flow measurements.

The first and second coefficients $C_1$ and $C_2$ can be determined by noting the tube period for flow materials m1 and m2 of two known, substantially distinct densities. The solution can solve two equations for two unknowns. The stiffness coefficient $C_1$ can be determined as:

$$C_1 = \frac{(\rho_{m1} - \rho_{m2})}{(\tau_{m1}^2 - \tau_{m2}^2)} \quad (7)$$

Here, $\rho_{m1}$ is the density of a first flow material m1, $\tau_{m1}$ is the corresponding tube period for the first flow material m1, $\rho_{m2}$ is the density of a second flow material m2, and $\tau_{m2}$ is the corresponding tube period for the second flow material m2. It should be understood that m1 and m2 can comprise any two flow materials having substantially distinct densities. For example, if the densities differ by at least 0.1 g/cc, then the coefficients $C_1$ and $C_2$ can be accurately and satisfactorily resolved. For example, the first flow material m1 can comprise a gas and the second flow material m2 can comprise a liquid (or vice versa). In another example, the first flow material m1 can comprise air and the second flow material m2 can comprise water. It should be understood that the above flow materials are given as examples, and are not limiting.

The mass coefficient C2 can be further simplified as:

$$C_2 = C_1\tau_{m2}^2 - \rho_{m2} \quad (8)$$

Consequently, the stiffness coefficient $C_1$ 213 and the mass coefficient $C_2$ 214 can be determined by generating tube periods $\tau$ and obtaining flow material densities p for at least two flow materials m1 and m2. Two or more flow materials are needed in order to solve two equations for two unknowns, as previously discussed. In addition, the coefficients can be periodically and/or repeatedly determined in order to detect stiffness and/or mass error conditions.

In use, the stiffness coefficient $C_1$ can be tracked over time. For example, statistical techniques can be used to determine any changes in the stiffness coefficient $C_1$ over time. A statistical change in $C_1$ can indicate that the FCF for the particular flow meter has changed.

The invention provides a stiffness coefficient $C_1$ that does not rely on stored or recalled calibration density values. This is in contrast to the prior art, where a known flow material is used in a factory calibration operation to obtain a density standard that can be used for all future calibration operations. The invention provides a stiffness coefficient $C_1$ that is obtained from vibrational responses of the flow meter and known flow material densities. The invention provides a stiffness detection/calibration process without the need for a factory calibration process.

The interface 201 receives the vibrational response 211 from one of the velocity sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices. The interface 201 can be capable of any manner of electronic, optical, or wireless communication.

The interface 201 in one embodiment is coupled with a digitizer (not shown), wherein the sensor signal comprises an analog sensor signal. The digitizer samples and digitizes an analog vibrational response and produces the digital vibrational response 211.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The storage system 204 can store flow meter parameters and data, software routines, constant values, and variable values. In one embodiment, the storage system 204 includes routines that are executed by the processing system 203, such as a coefficient routine 210 that determines one or more coefficients for the flow meter 5.

In one embodiment, the storage system 204 stores variables used to operate the flow meter 5. The storage system 204 in one embodiment stores variables such as the vibrational response 211, which can be received from the velocity/pick-off sensors 170L and 170R, for example.

In one embodiment, the storage system 204 stores constants, coefficients, and working variables. For example, the storage system 204 can store a determined stiffness coefficient $C_1$ 213 and a determined mass coefficient $C_2$ 214. The storage system 204 can further store a pair of the same coefficients that are determined later in time, such as a second stiffness coefficient $C_{1,t2}$ 216 and a second mass coefficient $C_{2,t2}$ 217. The storage system 204 can store working values such as a first tube period $\tau_1$ 220, a second tube period $\tau_2$ 221, a first density $\rho_1$ 222, and a second density $\rho_2$ 223. In addition, the storage system 204 can store constants, thresholds, or ranges, such as the stiffness tolerance 230 and the mass tolerance 232.

Figure 3:
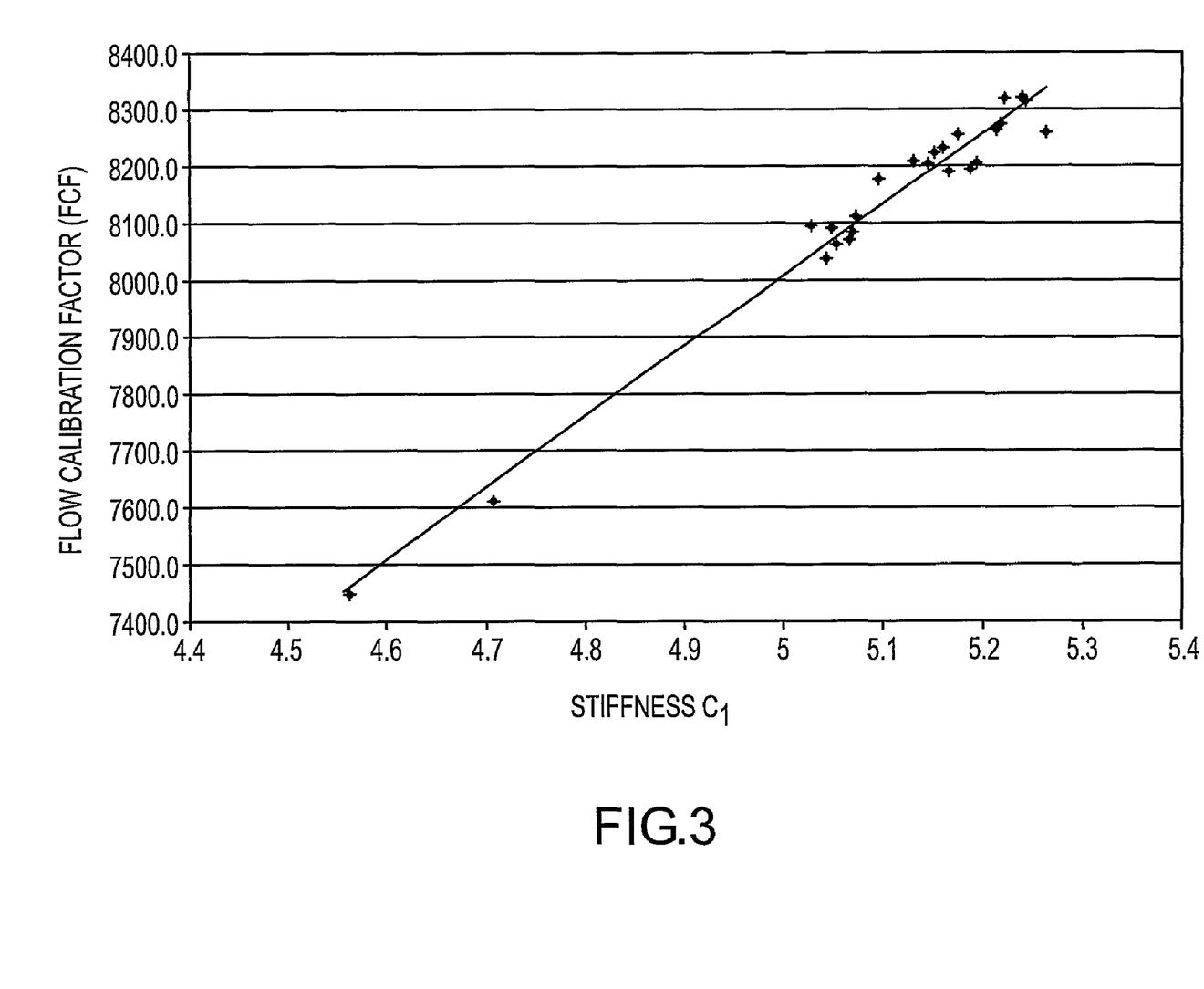
FIG. 3 is a graph of Flow Calibration Factor (FCF) versus stiffness coefficient $C_1$.

FIG. 3 is a graph of Flow Calibration Factor (FCF) versus stiffness coefficient $C_1$. The graph data was empirically obtained for a typical flow meter. A strong correlation between $C_1$ and FCF is seen in this graph, and is further shown by the corresponding correlation coefficient of 97.8%. The graph therefore demonstrates that the stiffness coefficient $C_1$ can be used to monitor the FCF value and the stiffness coefficient $C_1$ can be used to detect changes to the FCF.

Figure 4:
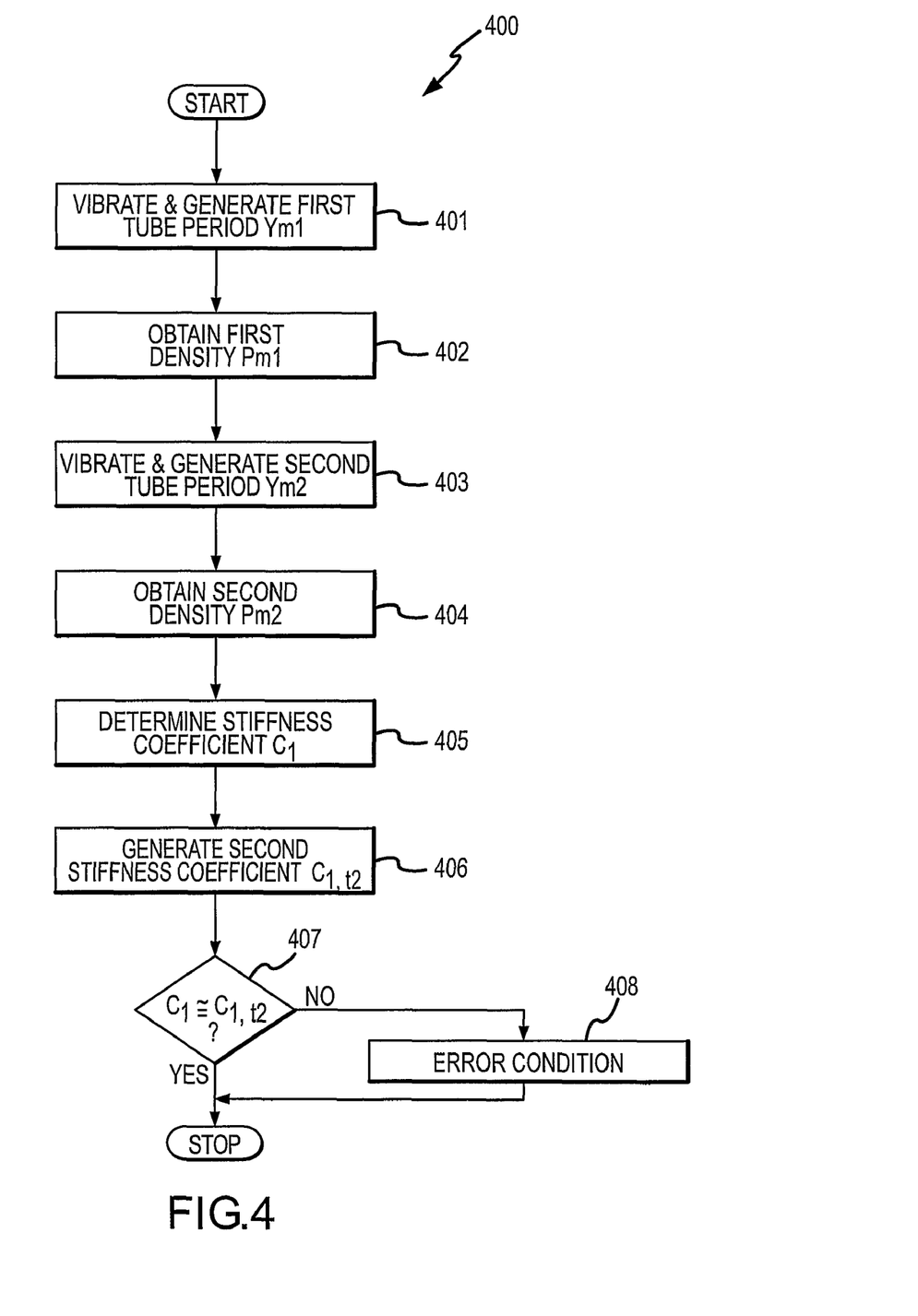
FIG. 4 is a flowchart of a method for determining a stiffness coefficient $C_1$ of a vibratory flow meter according to an embodiment of the invention.

FIG. 4 is a flowchart 400 of a method for determining a stiffness coefficient $C_1$ of a vibratory flow meter according to an embodiment of the invention. In step 401, the meter assembly 10 is vibrated, wherein the meter assembly 10 contains a first flow material m1. The flow material can be static or can be flowing through the meter assembly 10. A vibrational response is measured, and the vibrational response is used to generate a first tube period $\tau_{m1}$ for the first flow material m1. The tube period $\tau$ comprises the inverse of the frequency (i.e., $\tau=1/f$). The vibrational response in one embodiment comprises a frequency response.

In step 402, a first density $\rho_{m1}$ is obtained. The first density $\rho_{m1}$ can be input by an operator, for example, or can be selected and recalled from memory.

In step 403, the meter assembly 10 is vibrated with a second flow material m2 present. The second flow material m2 differs from the first flow material m1, such as by having a substantially distinct density. A second vibrational response is received and a second tube period $\tau_{m2}$ is determined.

In step 404, a second density $\rho_{m2}$ is obtained, similar to the first density $\rho_{m1}$. The second density $\rho_{m2}$ is substantially distinct from the first density $\rho_{m1}$, as previously discussed.

In step 405, a stiffness coefficient $C_1$ is determined from the first density $\rho_{m1}$, the first tube period $\tau_{m1}$, the second density $\rho_{m2}$, and the second tube period $\tau_{m2}$ (see equation (7)).

In step 406, a second stiffness coefficient $C_{1,t2}$ is generated at a second time instance t2. The second stiffness coefficient $C_{1,t2}$ is generated in the same manner as the stiffness coefficient $C_1$, above. The second stiffness coefficient $C_{1,t2}$ can be generated using the first and second flow materials m1 and m2, or can be generated using a third flow material m3 and a fourth flow material m4.

In step 407, the second stiffness coefficient $C_{1,t2}$ is compared to the stiffness coefficient $C_1$. The comparison can be performed in order to determine if the stiffness of the meter assembly 10 has substantially changed. The comparison can further compare a stiffness coefficient change to a stiffness tolerance 230. If the stiffness coefficient change exceeds the stiffness tolerance 230, then the method branches to step 408; otherwise, the method is complete.

In step 408, because the stiffness coefficient change exceeds the stiffness tolerance 230, then an error condition is set. The error condition can include any manner of error flag, variable, indicator, or routine.

Figure 5:
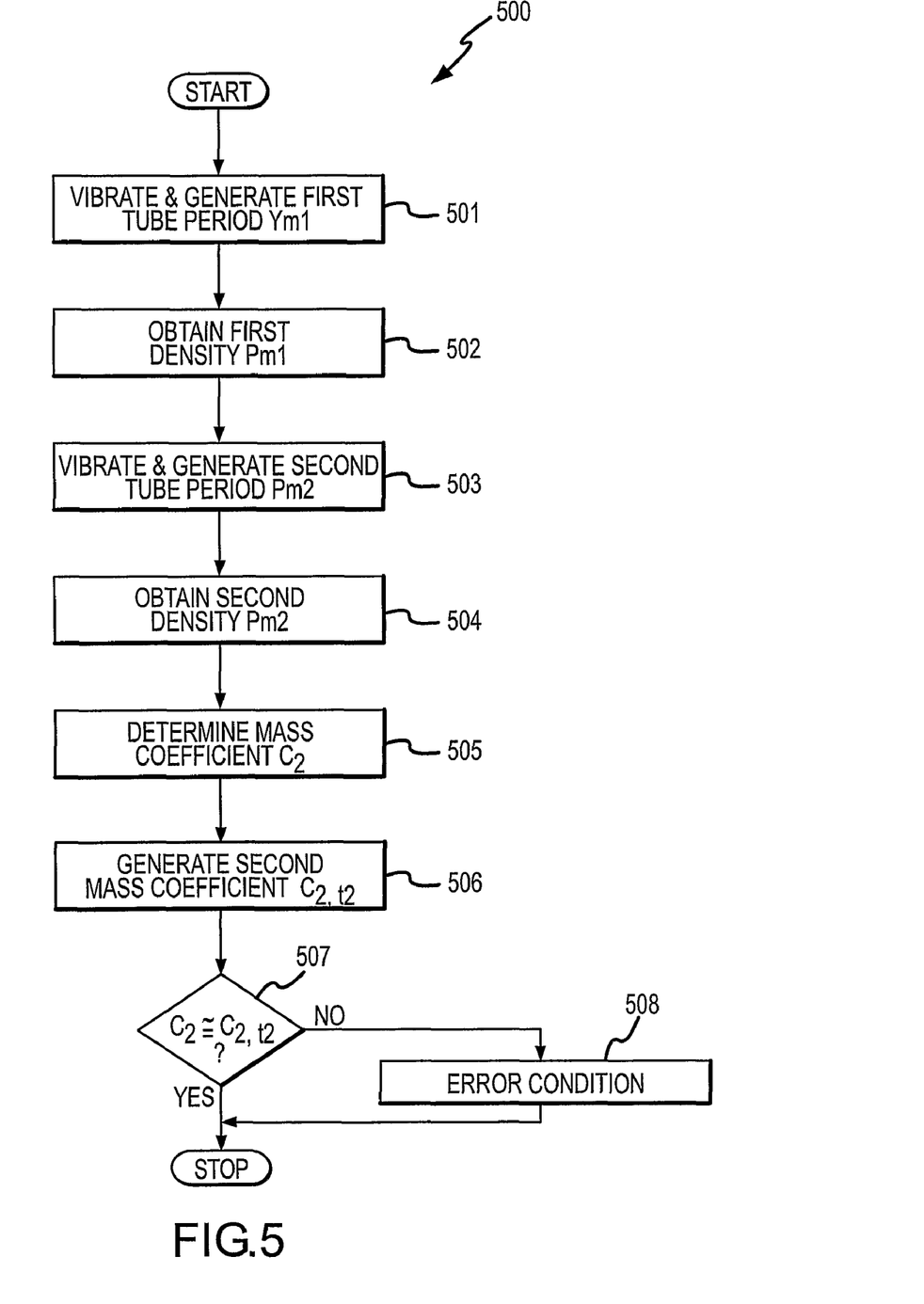
FIG. 5 is a flowchart of a method for determining a mass coefficient $C_2$ of a vibratory flow meter according to an embodiment of the invention.

FIG. 5 is a flowchart 500 of a method for determining a mass coefficient $C_2$ of a vibratory flow meter according to an embodiment of the invention. In step 501, the meter assembly 10 is vibrated in order to generate a first tube period $\tau_{m1}$, as previously discussed.

In step 502, a first density $\rho_{m1}$ is obtained, as previously discussed.

In step 503, the meter assembly 10 is vibrated with a second flow material m2, as previously discussed, in order to obtain the second tube period $\tau_{m2}$. The second flow material m2 differs from the first flow material m1, as previously discussed.

In step 504, a second density $\rho_{m2}$ is obtained, as previously discussed.

In step 505, a mass coefficient $C_2$ is determined from at least the second tube period $\tau_{m2}$ and the second density $\rho_{m2}$. The determination can employ the stiffness coefficient $C_1$ and the second tube period $\tau_{m2}$ and the second density $\rho_{m2}$ (see equation (8)). Alternatively, the determination can employ all four determined variables according to:

$$C_2 = \frac{(\rho_{m1} - \rho_{m2})}{(\tau_{m1}^2 - \tau_{m2}^2)}\tau_{m2}^2 - \rho_{m2} \qquad (9)$$

In step 506, a second mass coefficient $C_{2,t2}$ is generated at a second time instance t2. The second mass coefficient $C_{2,t2}$ is generated in the same manner as the mass coefficient $C_2$, above. The second mass coefficient $C_{2,t2}$ can be generated using the first and second flow materials m1 and m2, or can be generated using a third flow material m3 and a fourth flow material m4.

In step 507, the second mass coefficient $C_{2,t2}$ is compared to the mass coefficient $C_2$. The comparison can be performed in order to determine if the mass of the meter assembly 10 has substantially changed. The comparison can further compare a mass coefficient change to a mass tolerance 232. If the mass coefficient change exceeds the mass tolerance 232, then the method branches to step 508; otherwise, the method is complete.

In step 508, because the mass coefficient change exceeds the mass tolerance 232, then an error condition is set. The error condition can include any manner of error flag, variable, indicator, or routine.

Figure 6:
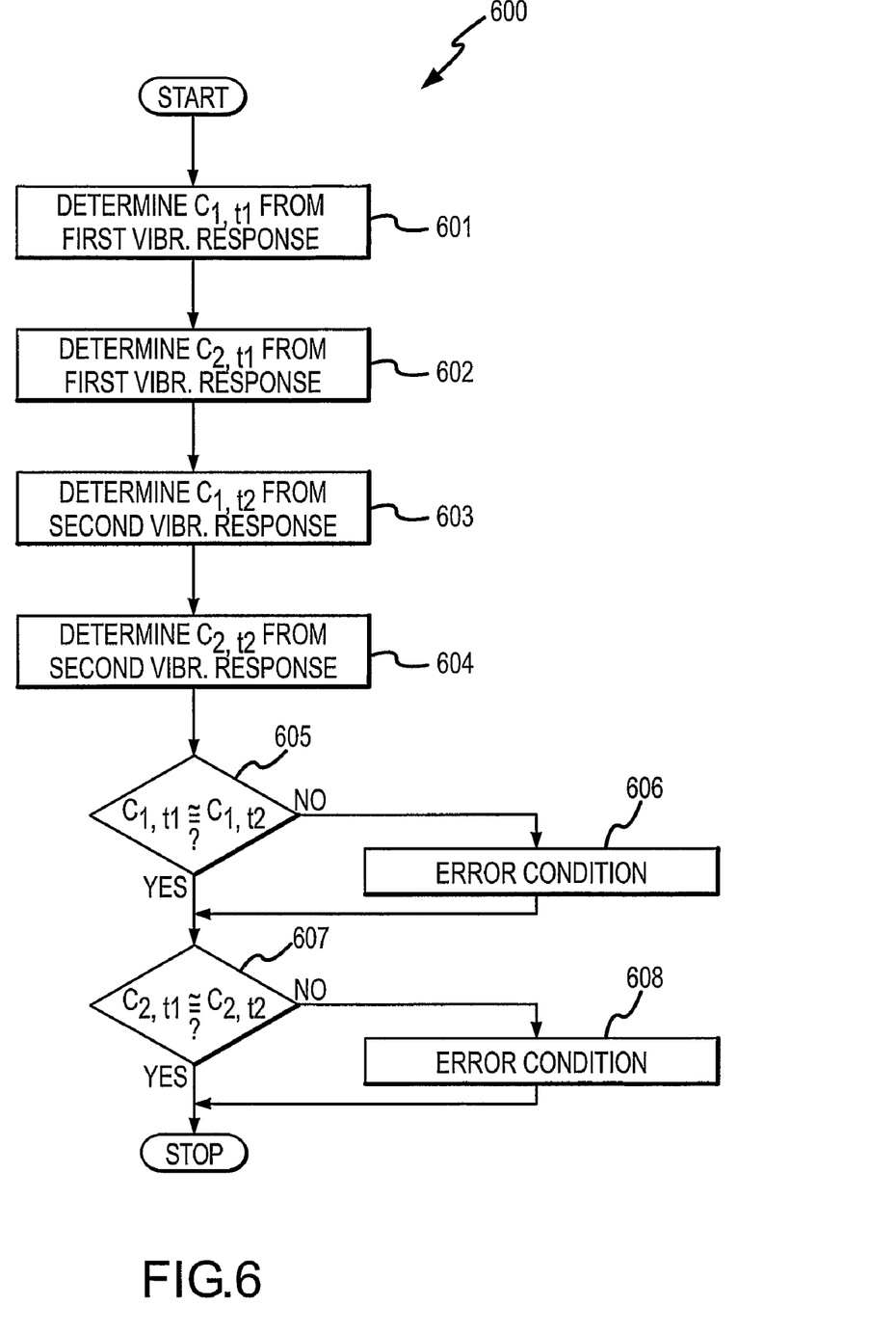
FIG. 6 is a flowchart of a method for determining a stiffness coefficient change and/or a mass coefficient change according to an embodiment of the invention.

FIG. 6 is a flowchart 600 of a method for determining a stiffness coefficient change and/or a mass coefficient change according to an embodiment of the invention. In step 601, a first stiffness coefficient $C_{1,t1}$ for a first flow material m1 is determined at a first time instance t1. The first stiffness coefficient $C_{1,t1}$ is determined from a first density $\rho_{m1}$, a first tube period $\tau_{m1}$, a second density $\rho_{m2}$, and a second tube period $\tau_{m2}$, as previously described.

In step 602, a first mass coefficient $C_{2,t1}$ for the first flow material m1 is also determined for the first time instance t1. The first mass coefficient $C_{2,t1}$ is also determined from the first time instance tube periods and densities.

In step 603, a second stiffness coefficient $C_{1,t2}$ is determined at a second time instance t2. The second time instance t2 is different from the first time instance t1. Any amount of time can extend between the first time instance t1 and the second time instance t2. It should be noted that the flow materials used to generate the second stiffness coefficient $C_{1,t2}$ can be the same or different than the flow materials used to generate the first stiffness coefficient $C_{1,t1}$. The same also applies to the mass coefficient $C_2$.

In step 604, a second mass coefficient $C_{2,t2}$ is determined at the second time instance t2.

In step 605, the first stiffness coefficient $C_{1,t1}$ is compared to the second stiffness coefficient $C_{1,t2}$. The comparison can be performed in order to determine if the stiffness of the flow meter 5 has substantially changed. The comparison can further compare a stiffness coefficient change to a stiffness tolerance 230. The stiffness tolerance 230 can comprise any manner of tolerance threshold or tolerance range. If the stiffness coefficient change exceeds the stiffness tolerance 230, then the method branches to step 606; otherwise, the method proceeds to step 607.

In step 606, because the stiffness coefficient change exceeds the stiffness tolerance 230, then an error condition is set. The error condition can include any manner of error flag, variable, indicator, or routine.

In step 607, the first mass coefficient $C_{2,t1}$ is compared to the second mass coefficient $C_{2,t2}$. The comparison can be performed in order to determine if the mass of the flow meter 5 has substantially changed. The comparison can further compare a mass coefficient change to a mass tolerance 232. If the mass coefficient change exceeds the mass tolerance 232, then the method branches to step 608; otherwise, the method is complete.

In step 608, because the mass coefficient change exceeds the mass tolerance 232, then an error condition is set. The error condition can include any manner of flag, variable, indicator, alarm, or routine, as previously discussed.

The method 600 can be iteratively, periodically, or randomly performed. It should be understood that the method 600 can be repeatedly performed for one or both of the coefficients $C_1$ and $C_2$. The method 600 can be performed at predetermined landmarks, such as at a predetermined hours of operation, upon a change in flow material, etc.

The meter electronics and methods according to the invention can be employed according to any of the embodiments in order to provide several advantages, if desired. The invention provides a stiffness coefficient $C_1$ that is substantially related to a flowtube stiffness of the flow meter. The invention provides a mass coefficient $C_2$ that is substantially related to a mass of the flow meter. The invention provides coefficients that do not rely on stored or recalled calibration density values. The invention provides coefficients that are obtained from vibrational responses of the flow meter.

The invention provides a stiffness detection/calibration process without the need for a factory calibration process. The invention can perform a calibration process in the field. The invention can perform a calibration process at any time. The invention can perform a calibration process without the need for a calibration test rig and without the need for specific calibration flow materials.

The invention can perform a calibration process using two or more flow materials. The invention can perform calibration processes that determine changes in stiffness of the flow meter over time. The invention can perform calibration processes that determine changes in mass of the flow meter over time.

I claim:

1. Meter electronics (20) for a flow meter (5), the meter electronics (20) comprising an interface (201) for receiving a vibrational response and a processing system (203) in communication with the interface (201), with the meter electronics (20) being characterized by:
   the processing system (203) being configured to receive the vibrational response from the interface (201), vibrate at least one flowtube (130) of the vibratory flow meter (5) and generate a first tube period $\tau_{m1}$ for a first flow material m1, vibrate the at least one flowtube (130) of the vibratory flow meter (5) and generate a second tube period $\tau_{m2}$ for a second flow material m2, determine one or more of a stiffness coefficient $C_1$ or a mass coefficient $C_2$ from the first tube period $\tau_{m1}$, a first density $\rho_{m1}$, the second tube period $\tau_{m2}$, and a second density $\rho_{m2}$, generate one or more of a second stiffness coefficient $C_{1,t2}$ or a second mass coefficient $C_{2,t2}$ at a second time t2, compare the second stiffness coefficient $C_{1,t2}$ to the stiffness coefficient $C_1$ or compare the second mass coefficient $C_{2,t2}$ to the mass coefficient $C_2$, and enerate an error condition if the second stiffness coefficient $C_{1,t2}$ differs from the stiffness coefficient $C_1$ by more than a predetermined stiffness tolerance or if the second mass coefficient $C_{2,t2}$ differs from the mass coefficient $C_2$ by more than a predetermined mass tolerance.

2. The meter electronics (20) of claim 1, wherein the first flow material m1 comprises a gas and the second flow material m2 comprises a liquid.

3. The meter electronics (20) of claim 1, wherein the first flow material m1 comprises air and the second flow material m2 comprises water.

4. The meter electronics (20) of claim 1, with the stiffness coefficient $C_1$ comprising $C_1 = (\rho_{m1} - \rho_{m2})/((\tau_{m1})^2 - (\tau_{m2})^2)$.

5. The meter electronics (20) of claim 1, with the mass coefficient $C_2$ comprising $C_2 = C_1(\tau_{m2})^2 - \rho_{m2}$.

6. The meter electronics (20) of claim 1, with the mass coefficient $C_2$ comprising $C_2 = [(\rho_{m1} - \rho_{m2})/((\tau_{m1})^2 - (\tau_{m2})^2)](\tau_{m2})^2 - \rho_{m2}$.

7. A method for determining a stiffness coefficient $C_1$ of a vibratory flow meter, the method comprising vibrating at least one flowtube of the vibratory flow meter and generating a first tube period $\tau_{m1}$ for a first flow material m1, the method being characterized by:
   vibrating the at least one flowtube of the vibratory flow meter and generating a second tube period $\tau_{m2}$ for a second flow material m2;
   determining the stiffness coefficient $C_1$ from the first tube period $\tau_{m1}$, a first density $\rho_{m1}$, the second tube period $\tau_{m2}$, and a second density $\rho_{m2}$;
   generating a second stiffness coefficient $C_{1,t2}$ at a second time;
   comparing the second stiffness coefficient $C_{1,t2}$ to the Stiffness coefficient $C_1$; and
   generating an error condition if the second stiffness coefficient $C_{1,t2}$ differs from the stiffness coefficient $C_1$ by more than a predetermined stiffness tolerance.

8. The method of claim 7, wherein the first flow material m1 comprises a gas and the second flow material m2 comprises a liquid.

9. The method of claim 7, wherein the first flow material m1 comprises air and the second flow material m2 comprises water.

10. The method of claim 7, with the stiffness coefficient $C_1$ comprising $C_1 = (\rho_{m1} - \rho_{m2})/((\tau_{m1})^2 - (\tau_{m2})^2)$.

11. The method of claim 7, further comprising determining a mass coefficient $C_2$ comprising $C_2 = C_1(\tau_{m2})^2 - \rho_{m2}$.

12. The method of claim 7, further comprising determining a mass coefficient $C_2$ comprising $C_2=[(\rho_{m1}-\rho_{m2})/((\tau_{m1})^2-(\tau_{m2})^2)](\tau_{m2})^2-\rho_{m2}$.

13. A method for determining a mass coefficient $C_2$ of a vibratory flow meter, the method comprising vibrating at least one flowtube of the vibratory flow meter and generating a first tube period $\tau_{m1}$ for a first flow material m1, the method being characterized by:
  vibrating the at least one flowtube of the vibratory flow meter and generating a second tube period $\tau_{m2}$ for a second flow material m2;
  determining the mass coefficient $C_2$ from at least the second tube period $\tau_{m2}$, and a second density $\rho_{m2}$;
  generating a second mass coefficient $C_{2,t2}$ at a second time;
  comparing the second mass coefficient $C_{2,t2}$ to the mass coefficient $C_2$; and
  generating an error condition if the second mass coefficient $C_{2,t2}$ differs from the mass coefficient $C_2$ by more than a s predetermined mass tolerance.

14. The method of claim 13, wherein the first flow material m1 comprises a gas and the second flow material m2 comprises a liquid.

15. The method of claim 13, wherein the first flow material m1 comprises air and the second flow material m2 comprises water.

16. The method of claim 13, with the mass coefficient $C_2$ comprising $C_2=C_1(\tau_{m2})^2-\rho_{m2}$.

17. The method of claim 13, with the mass coefficient $C_2$ comprising $C_2=[(\rho_{m1}-\rho_{m2})/((\tau_{m1})^2-(\tau_{m2})^2)](\tau_{m2})^2-\rho_{m2}$.

18. The method of claim 13, further comprising determining a stiffness coefficient $C_1$ comprising $C_1=(\rho_{m1}-\rho_{m2})/((\tau_{m1})^2-(\tau_{m2})^2)$.

19. A method for determining a stiffness coefficient change in a vibratory flow meter, the method comprising vibrating at least one flowtube of the vibratory flow meter at a first time instance t1 and generating a first tube period $\tau_{m1,t1}$ for a first flow material m1, the method being characterized by:
  vibrating the at least one flowtube at substantially the first time instance t1 and generating a second tube period $\tau_{m2,t1}$ for a second flow material m2;
  determining a first stiffness coefficient $C_{1,t1}$ at the first time instance t1 from the first tube period $\tau_{m1,t1}$, a first density $\rho_{m1,t1}$, the second tube period $\tau_{m2,t1}$, and a second density $\rho_{m2,t1}$;
  vibrating the at least one flowtube at a second time instance t2 and generating a third tube period $\tau_{m3,t2}$ for a third flow material m3;
  vibrating the at least one flowtube at substantially the second time instance t2 and generating a fourth tube period $\tau_{m4,t2}$ for a fourth flow material m4;
  determining a second stiffness coefficient $C_{1,t2}$ at the second time instance t2 from the third tube period $\tau_{m3,t2}$, a third density $\rho_{m3,t2}$, the fourth tube period $\tau_{m4,t2}$, and a fourth density $\rho_{m4,t2}$; and
  comparing the first stiffness coefficient $C_{1,t1}$ and the second stiffness coefficient $C_{1,t2}$ in order to determine if a stiffness of the vibratory flow meter has changed between the first time instance t1 and the second time instance t2.

20. The method of claim 19, with the first stiffness coefficient $C_{1,t1}$ and the second stiffness coefficient $C_{1,t2}$ comprising $C_1=(\rho_{m1}-\rho_{m2})/((\tau_{m1})^2-(\tau_{m2})^2)$.

21. The method of claim 19, further comprising:
  determining a first mass coefficient $C_{2,t1}$ and a second mass coefficient $C_{2,t2}$ comprising $C_2=C_1(\tau_{m2})^2-\rho_{m2}$; and
  comparing the first mass coefficient $C_{2,t1}$ and the second mass coefficient $C_{2,t2}$ in order to determine if a mass of the vibratory flow meter has changed between the first time instance t1 and the second time instance t2.

22. The method of claim 19, further comprising:
  determining a first mass coefficient $C_{z,t1}$ and a second mass coefficient $C_{2,t2}$ comprising $C_2=[(\rho_{m1}-\rho_{m2})/((\tau_{m1})^2-(\tau_{m2})^2)](\tau_{m2})-\rho_{m2}$; and
  comparing the first mass coefficient $C_{2,t1}$ and the second mass coefficient $C_{2,t2}$ in order to determine if a mass of the vibratory flow meter has changed between the first time instance t1 and the second time instance t2.

23. A method for determining a mass coefficient change in a vibratory flow meter, the method comprising vibrating at least one flowtube of the vibratory flow meter at a first time instance t1 and generating a first tube period $\tau_{m1,t1}$ for a first flow material m1, the method being characterized by:
  vibrating the at least one flowtube at substantially the first time instance t1 and generating a second tube period $\tau_{m2,t1}$ for a second flow material m2;
  determining a first mass coefficient $C_{2,t1}$ at the first time instance t1 from the first tube period $\tau_{m1,t1}$, a first density $\rho_{m1,t1}$, the second tube period $\tau_{m2,t1}$, and a second density $\rho_{m2,t1}$;
  vibrating the at least one flowtube at a second time instance t2 and generating a third tube period $\tau_{m3,t2}$ for a third flow material m3;
  vibrating the at least one flowtube at substantially the second time instance t2 and generating a fourth tube period $\tau_{m4,t2}$ for a fourth flow material m4;
  determining a second mass coefficient $C_{2,t2}$ at the second time instance t2 from the third tube period $\tau_{m3,t2}$, a third density $\rho_{m3,t2}$, the fourth tube period $\tau_{m4,t2}$, and a fourth density $\rho_{m4,t2}$; and
  comparing the first mass coefficient $C_{2,t1}$ and the second mass coefficient $C_{2,t2}$ in order to determine if a mass of the vibratory flow meter has changed between the first time instance t1 and the second time instance t2.

24. The method of claim 23, with the first mass coefficient $C_{2,t1}$ and the second mass coefficient $C_{2,t2}$ comprising $C_2=C_1(\tau_{m2})^2-\rho_{m2}$.

25. The method of claim 23, with the first mass coefficient $C_{2,t1}$ and the second mass coefficient $C_{2,t2}$ comprising $C_2=[(\rho_{m1}-\rho_{m2})/((\tau_{m1})^2-(\tau_{m2})^2)](\tau_{m2})^2-\rho_{m2}$.

26. The method of claim 23, further comprising:
  determining a first stiffness coefficient $C_{1,t1}$ and a second stiffness coefficient $C_{1,t2}$ comprising $C_1=(\rho_{m1}-\rho_{m2})/((\tau_{m1})_2-(\tau_{m2})^2)$; and
  comparing the first stiffness coefficient $C_{1,t1}$ and the second stiffness coefficient $C_{1,t2}$ in order to determine if a stiffness of the vibratory flow meter has changed between the first time instance t1 and the second time instance t2.

* * * * *

UNITED STATES PATENT AND TRADEMARK OFFICE
CERTIFICATE OF CORRECTION

| | |
|---|---|
| PATENT NO. | : 7,774,150 B2 |
| APPLICATION NO. | : 12/067402 |
| DATED | : August 10, 2010 |
| INVENTOR(S) | : Charles Paul Stack |

Page 1 of 1

It is certified that error appears in the above-identified patent and that said Letters Patent is hereby corrected as shown below:

Column 12, Line 21 replace "enerate" with --generate--

Column 13, Line 19 remove "s"

Column 14, Line 12 replace "$C_{zt1}$" with --$C_{2,11}$--

Column 14, Line 13 replace "$C_{2,12}$" with --$C_{2,12}$--

Signed and Sealed this
Eighth Day of March, 2011

David J. Kappos
*Director of the United States Patent and Trademark Office*

UNITED STATES PATENT AND TRADEMARK OFFICE
CERTIFICATE OF CORRECTION

PATENT NO. : 7,774,150 B2  Page 1 of 1
APPLICATION NO. : 12/067402
DATED : August 10, 2010
INVENTOR(S) : Charles Paul Stack It is certified that error appears in the above-identified patent and that said Letters Patent is hereby corrected as shown below:

Column 12, Line 21 replace "enerate" with --generate--

Column 13, Line 19 remove "s"

Column 14, Line 12 replace "$C_{zt1}$" with --$C_{2,t1}$--

Column 14, Line 13 replace "$C_{2'12}$" with --$C_{2,t2}$--

This certificate supersedes the Certificate of Correction issued March 8, 2011.

Signed and Sealed this
Twelfth Day of July, 2011

David J. Kappos
*Director of the United States Patent and Trademark Office*